Patented July 16, 1946

2,404,061

UNITED STATES PATENT OFFICE 2,404,061

METHOD FOR FILTERING

Julian P. Hamilton, Pelly, and Charles F. Jones, Goose Creek, Tex., assignors to Standard Oil Development Company, a corporation of Delaware No Drawing. Application October 19, 1943, Serial No. 506,898

5 Claims. (Cl. 210—201)

The present invention is directed to a method for filtering in which a sheet filtering surface is precoated with a filtering aid before the filtering operation is begun.

The present invention is particularly applicable to the filtration of asphaltic or gummy materials by means of rotary filters. An example of such an operation is the filtration of cracked tars in petroleum refineries through a rotating filtering element with the filtering element provided with a precoating of filtering aid, such as diatomaceous earth, before the tar is passed through the filter.

It has been known to the art to filter tarry or resinous material, such as hot cracking coal tars, through a rotary filter. In this operation it has been customary to deposit preliminarily upon the filter screen a diatomaceous earth precoat with a thickness of the order of three inches. As the filter surface revolved the precoat was trimmed off at a rate of from 0.001 to 0.003 inch per revolution of the filter drum until the precoat remaining was no more than one-quarter of an inch thick. It has then been customary to displace the hot cracking tar with a cooler liquid to cool the filter shell, as much of this cooler liquid being drawn through the filter as possible and the remainder pumped out. The filter screen and remaining precoat was then sprayed with gas oil to remove as much of the precoat and deposited solids as possible. In such a procedure, however, substantial amounts of residual materials from the tar penetrate through the precoat to the screen and the residual heel is plugged and bound to the filter screen by these tarry or resinous materials. This contaminated heel cannot be removed from the filter by washing with gas oil or a similar solvent and, accordingly, it has been necessary to open the filter and remove the remainder of the precoat and the tarry materials plugging the screen, by the use of steel brushes. In such operations the time required to open the filter and clean the screen was large with respect to the total filtering cycle.

The exact nature of the tarry or resinous materials which penetrate below the surface of the precoat and act to plug and bind the residual heel to the filter screen is not known. As a postulate, it is suggested that the hot cracking coal tars or viscosity breaker bottoms conventionally filtered include viscous or resinous liquids which penetrate into the precoat and form a coating on the surfaces of the particles comprising the precoat. These tarry or resinous materials may become coked at the high temperature of filtration, or the gas employed in the filter may not be absolutely inert but may contain a minor amount of oxygen which oxidizes these materials. Another explanation, or an explanation supplementing the preceding postulate, is that the tarry or resinous materials are relatively fluid at the temperatures of the order of 600° F. employed for the filtering step but are substantially solid at the temperatures of the order of 250° F. commonly used for washing and discharging the filter. It will be understood that these postulates explaining the formation of the residual heel in the filter during conventional filtering operations are suggested only by way of explanation and are in no wise intended to limit the present invention.

We have now discovered that a greatly increased filtering capacity may be obtained when filtering cracked tars and other tarry or resinous material. In accordance with our discovery, the filtering operation is terminated before the resinous or tarry materials being separated from the filtrate penetrate through the precoat to the filter screen. The charge remaining within the filter shell is discharged therefrom, being replaced, for example, with gas oil and the portion of the precoat into which the resinous and tarry materials have penetrated is trimmed off by the filter knife or doctor. After the removal of the plugged portion of the precoat the remainder of the precoat, free from binding and plugging materials, is either removed entirely by washing or, alternatively, it is left on the filter screen as a base and a new layer of precoat deposited on the filter and the filtering cycle repeated.

The improvement in the capacity of the filter by the employment of the present invention is indicated in the following table, in which the conventional procedure is shown under the heading "Old operation" with runs 1, 2 and 3 and the employment of the present invention shown under the heading "New operation" with runs 4, 5 and 6. Whereas, the filtering time per cycle under the old operation is somewhat longer than under the new operation, the turnaround time has been so reduced under the new operation that the total time per cycle is much less under the new operation and gives a greatly increased capacity factor. The three runs carried out under the old operating conditions had an average cycle time of 85 hours, while the runs under the new operation had an average cycle time of 53.7 hours and the capacity factor of the filter was increased from 62.1 per cent under the old operation to 81.7 per cent under the new operation.

Table I

| Run No. | Old operation, average ||| | New operation, average ||| |
| --- | --- | --- | --- | --- | --- | --- | --- | --- |
|  | 1 | 2 | 3 |  | 4 | 5 | 6 |  |
| Precoating time......hours.. | 3.3 | 3.5 | 4.0 | 3.6 | 3.0 | 2.5 | 4.5 | 3.3 |
| Filtering time......do.... | 54.5 | 53.0 | 51.0 | 52.8 | 50.0 | 41.5 | 48.5 | 46.7 |
| Cooling time......do.... | 2.0 | 3.5 | 2.0 | 2.5 | 1.0 | 2.5 | 2.0 | 1.8 |
| Turnaround time......do.... | 15.0 | 6.5 | 57.0 | 26.1 | 2.0 | 3.2 | 0.7 | 1.9 |
| Cycle time......do.... | 74.8 | 66.5 | 114.0 | 85.0 | 56.0 | 49.7 | 55.7 | 53.7 |
| Capacity factor: Filtering time / Cycle time ......per cent.. | 72.9 | 79.8 | 44.8 | 62.1 | 75.8 | 83.4 | 87.1 | 81.7 |

Runs 1, 2 and 3 in the above table were conducted as follows:

A slurry of diatomaceous earth in gas oil was forced into the filter shell and gas oil passed through the filter medium until a diatomaceous earth precoating three inches thick formed on the filter screen. The slurry was then displaced from the filter shell and viscosity breaker bottoms at 600° F. passed through the filter while the screen was rotated at a uniform rate and the precoat trimmed off at the rate of 0.001 to 0.003 inch per revolution of the filter until a layer of precoat one-quarter inch thick remained. The filter shell was then cooled by replacing the viscosity breaker bottoms with cracked tar at 250° F. This tar was drawn through the filter in a normal manner and the residual tar in the filter shell then pumped out. The filter screen was then sprayed with gas oil to remove as much of the precoat as possible and the filter then opened and the filter screen scrubbed by hand with steel brushes. After this operation the screen was closed and the cycle was repeated.

Example 2.—New operations

The precoat was formed on the filter screen in the same manner as in Example 1. The viscosity breaker bottoms at 600° F. were then passed through the filter medium while the precoat was progressively removed by the filter knife until about three-quarters of an inch of the precoat remained on the filter. Cracked tar at 250° F. was then charged to the filter to cool it down with the tar being drawn through the filter but no precoat being removed during the cooling operation. The residual tar was then pumped out from the bottom of the filter shell and the knife blades advanced to remove approximately one-half inch thickness of the precoat, leaving a layer only about one-fourth inch thickness of the precoat on the filter shell. A slurry of diatomaceous earth in gas oil was then pumped into the filter shell and new precoat deposited directly upon the one-fourth inch layer of precoat to build up another precoat three inches in thickness and the filtering cycle was then repeated. The characteristics of the viscosity breaker bottoms, cracking coal tar and gas oil passed to the filter in the above examples are as follows:

Table II

|  | Viscosity-breaker bottoms | Cracking coal tar | Gas oil |
| --- | --- | --- | --- |
| Gravity, °API | 12.0 | 11.0 | 32.0 |
| Viscosity: |  |  |  |
| SSF at 210° F | 50 |  |  |
| SSF at 122° F | 1,150 | 25 |  |
| SU at 100° F |  |  | 40 |
| Sediment: |  |  |  |
| By extraction, wt. percent | 0.25 | 0.05 |  |
| By hot filtration, wt. percent | 1.0 | 0.06 |  |

While we have disclosed specific examples of the application of the present invention to the filtration of viscosity breaker bottoms and other viscous cracked tars consisting of asphaltic material, it is to be understood that the invention is not limited to the filtration of this specific material but may be applied generally to the treatment of materials, having incorporated therein tarry or resinous matter capable of penetrating a precoat to a considerable depth and which may combine with the solid particles of the precoat during the filtering operations and act to plug the precoat and bind it to the filter screen. It will also be understood that the method of the present invention is by no means limited to the specific temperatures given in the examples but that it may be practiced over a wide range of temperatures.

Having fully described the present invention, what we desire to claim is:

1. A method for filtering wherein a viscous liquid containing solids and substantial amounts of tarry materials capable of penetrating through a substantial thickness of precoat is passed through a moving filter screen provided with a substantial thickness of precoat, comprising the steps of continuously removing a thin layer of precoat and deposited solids from the filtering element while the viscous liquid is being passed through the element, terminating the filtration of viscous liquid while a substantial thickness of the precoat adjacent the screen is uncontaminated with the tarry materials, removing a layer of the remaining precoat having a thickness of the order of ½ inch and including at least that portion of the remaining precoat contaminated by the tarry materials, subsequently providing the filter screen with the precoat layer of substantial thickness and repeating the cycle.

2. A method for filtering comprising the steps of depositing a relatively thick layer of filter aid on a rotating filtering element, passing a viscous tar containing solids and substantial amounts of tarry materials capable of penetrating through a substantial depth of precoat therethrough and continuously removing a thin layer of precoat and deposited solids from the moving filtering element to provide a freshly exposed layer of precoat with every revolution of the filter, terminating filtration of the tar while the remaining precoat layer is of substantial thickness and before the tarry materials deposited thereon have penetrated that portion of the precoat adjacent the filter screen, removing the tar from contact with the filtering element, removing a layer of the remaining precoat having a thickness of the order of ½ inch and including at least the contaminated portions of the precoat remaining on the screen, providing a new precoat layer of approximately the same thickness of the layer at the beginning of the cycle and repeating the penetrating cycle.

3. A process in accordance with claim 2 in which a thin layer of uncontaminated precoat is retained on the filter screen and additional precoat is deposited thereon to build up the new precoat layer.

4. A method in accordance with claim 2 in which all of the precoat layer is removed from the filter screen, and the new precoat layer is built up directly on the filter screen.

5. A method for filtering comprising the steps of depositing a layer of filter aid on a rotating filtering element to a thickness of approximately 3 inches, forming a pool of highly viscous tar containing solids and asphaltic material capable of penetrating a substantial depth into a layer of precoat and at a temperature of the order of 600° F. in contact with said filtering element and filtering tar from said pool through said filtering element and continuously removing a thin layer of the precoat and deposited solids from said fitlering element while the viscous tar is being filtered, terminating the filtration of said tar when the precoat layer has been reduced to a thickness of the order of ¾ inch, replacing the tar in the pool with low viscosity tar at about 250° F. to cool the filter, removing the low viscosity tar from said pool, removing a layer of said precoat having a thickness of the order of ½ inch and including a contaminated portion, subsequently depositing a new layer of precoat on said filtering element to a depth of approximately 3 inches and repeating the cycle.

JULIAN P. HAMILTON.
CHARLES F. JONES.